April 7, 1964     R. W. SCHILLING     3,128,202
PRESSURE-SENSITIVE ADHESIVE TAPE
Filed Aug. 15, 1960
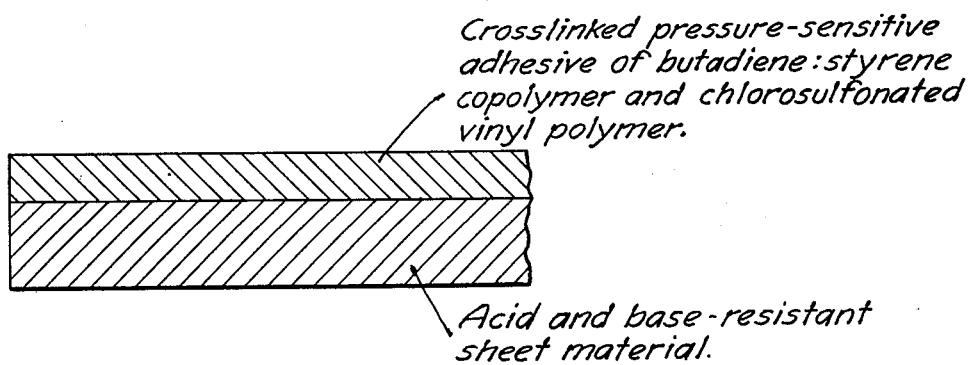
INVENTOR
ROBERT W. SCHILLING
BY
Carpenter, Abbott, Coulter & Kinney
ATTORNEYS

United States Patent Office 3,128,202
Patented Apr. 7, 1964

3,128,202
PRESSURE-SENSITIVE ADHESIVE TAPE
Robert W. Schilling, St. Paul, Minn., assignor to Minnesota Mining and Manufacturing Company, St. Paul, Minn., a corporation of Delaware
Filed Aug. 15, 1960, Ser. No. 49,412
5 Claims. (Cl. 117—122)

This invention relates to acid- and alkali-resistant hydrophobic normally tacky pressure-sensitive adhesive tapes which find particular utility in connection with masks used in chemical milling operations.

Chemical milling is a process using the technique of controlled chemical dissolution, or etching, of metal to achieve a specific design configuration. Because stock can be removed uniformly from large and/or complex shapes and in intricate patterns from a wide variety of structural metals, this process is now used by most airframe manufacturers. The operation is accomplished by masking the surface of the piece to be milled, scribing around and removing the maskant from the area to be etched, and immersing the article in a suitable acidic or basic solution which dissolves the exposed metal to the desired depth. The milled part is then rinsed in water and stored till needed. Etchants for various metals include 10% solutions of nitric acid, phosphoric acid, aqua regia, and sodium hydroxide.

A primary bottleneck in chemical milling processes is the masking operation. The most common technique presently employed is to spray, dip, or otherwise apply three to six coats of a rubber-based composition over the surface of the workpiece, drying between coats. If air-drying is used, the total operation requires 24 to 48 hours or longer, and even if oven drying is employed, it takes at least about an hour per coat. Even after multiple coatings have been applied, careful inspection is necessary to detect pinholes, which must be painstakingly patched by hand. It is difficult to find a rubber composition which will on the one hand adhere tenaciously to the metal during the turbulent etching operation and on the other hand be readily removable after the milling operation has been completed; further, to my knowledge, no rubbery composition is available which can be re-adhered after having once been removed. Pressure-sensitive adhesive tapes have been investigated as masks for chemical milling operations, but their use has been fraught with other problems. Prior to my invention, insofar as I am aware, there has been no ecomonically feasible pressure-sensitive adhesive capable of enduring both acidic and basic conditions, often at temperatures of 150° F. or higher, without degradation. In addition, previously known tapes have often failed to make uniformly intimate contact with the metal, so that air bubbles near the edge ruptured the seal at the line between areas to be etched and areas not to be etched, thereby ruining the workpiece.

I have now devised a tacky pressure-sensitive adhesive tape which is not adversely affected by several hours of exposure to either acidic or basic solutions, even at elevated temperatures. This tape employs an adhesive coated on a backing, e.g., an extruded film backing, in a manner such that the exposed adhesive surface is smooth and mirror-like. The smooth adhesive surface of the resulting pressure-sensitive adhesive tape may be maintained and protected with a smooth liner, or, if the opposite surface of the backing is sufficiently smooth, the tape may be wound in roll form directly upon itself. When used to mask areas for chemical milling processes, the smooth adhesive establishes such intimate contact with the metal that the etching solutions do not seep under the edge. This intimate contact is further insured by the fact that the adhesive I employ is not deleteriously affected by exposure to such solutions. Extremely large or intricate shapes may be masked for chemical milling quickly and easily in a single operation, requiring no drying, reducing to a fraction the masking time, and virtually eliminating the need for tedious visual inspection of the mask. Despite the fact that the adhesive clings to the metal surface with extraordinary force during the etching step, the tape can be readily removed thereafter and, if desired, replaced after examining the character of the milled edge. As a result of these advantages, my invention decreases the length of time required for chemical milling operations, while simultaneously providing a protective sheet which reduces the possibility of damage to the finished product during subsequent handling and storage.

In accordance with my invention, a normally tacky and pressure-sensitive adhesive composition is prepared by blending a rubbery butadiene:styrene copolymer, a tackifier therefor, and a compatible chlorosulfonated rubbery acid- and alkali-resistant polymer (e.g., chlorosulfonated polyethylene, chlorosulfonated polypropylene, or similar chlorosulfonated vinyl polymers) and thereafter individually crosslinking the two rubbery polymers. This adhesive is preferably coated on a smooth hydrophobic backing (e.g., lead foil, extruded polyester or fluorinated polymeric films, etc.) in such a manner that the exposed adhesive surface is substantially free from irregularities which may later entrap air during the masking operation. If the backing is translucent or transparent, a sufficiently smooth adhesive surface may be forced into contact with a plate glass surface so that no air bubbles are observed through the backing.

My invention is illustrated in the attached drawing, which shows a cross-sectional view of a chemical milling tape.

My invention will be better understood upon reference to the illustrative but non-limitative example set forth below, in which all parts are by weight:

*Example*

| | |
|---|---|
| Butadiene:styrene rubbery copolymer | 100 |
| Chlorosulfonated polyethylene polymer | 100 |
| Zinc oxide | 10 |
| Magnesium oxide (extra light, calcined) | 10 |
| Pentaerythritol ester of hydrogenated wood rosin | 80 |
| Paraffin oil | 20 |
| Oil-soluble heat-reactive phenol-aldehyde resin (Bakelite "CKR 1634") | 18 |
| Toluene | 795 |
| Denatured ethyl alcohol | 40 |

The butadiene:styrene copolymer of this example was Firestone Tire and Rubber Co. "FR–S 1004," containing from about 22 to 24 percent by weight bound styrene, having a Mooney viscosity of about 50 and a specific gravity of about 0.94.

The chlorosulfonated polymer used was "Hypalon 20," a product of E. I. du Pont de Nemours, Inc. The idealized structure for "Hypalon 20" is approximately as follows:

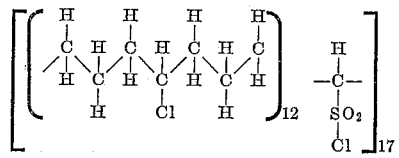

The rosin ester of this example was "Pentalyn H" (obtained from the Hercules Chemical Co.) which melts at 93° C., has a low acid number, is compatible with rubbery GRS polymers, and is a typical tackifying resin.

The butadiene: styrene rubbery copolymer and the zinc oxide were milled together on a cold (90° F.) rubber mill for approximately 20 minutes and removed in 20–30 lb. pigs. The chlorosulfonated polyethylene polymer and magnesium oxide were milled together on a warm (120° F.) rubber mill for approximately 20 minutes and also removed in 20–30 lb. pigs.

The milled adhesive bases were then charged to a heavy duty 250-gallon Baker-Perkins No. 15 mogul mixer, the jacket of which was heated with 80 lb. steam. Over a period of 10 minutes, with the mixer running, the wood rosin ester, previously crushed, was added. The steam was then turned off, and over the next 20 minutes the paraffin oil was added, its function being primarily to facilitate mixing. The batch was then cooled to 175° F. by the addition of Dry Ice. The phenol-aldehyde resin, which also had been finely crushed was then added, and the 80 lb. steam was turned on for five minutes and again turned off. In the ensuing exothermic reaction the butadiene:styrene copolymer was crosslinked by the phenol-aldehyde resin; the reaction was continued for about 50 minutes with concurrent continuous mixing, at the end of which time Dry Ice was added to cool the batch to approximately 175° F. and stop the reaction. At the same time the preceding crosslinking reaction was taking place, the chlorosulfonated polyethylene was also being crosslinked by some mechanism.[1] The toluene and alcohol were then added while mixing was continued to provide a smooth, homogeneous product.

A 0.0015-inch biaxially oriented polyethylene terephthalate film backing, primed with an ultraviolet radiation-anchored 50:50 rubber composition of butadiene:styrene rubber (Shell "GRS–1011") and butadiene:acrylonitrile rubber (Goodrich "Hycar 1001"), was then coated with the tacky pressure-sensitive adhesive composition referred to in the preceding paragarph and passed through a circulating air oven to remove the solvent. The resulting tacky pressure-sensitive adhesive sheet material was then wound on itself in roll form, where it could be stored till needed.

The pressure-sensitive tape prepared as described above was applied to the surface of a variety of aluminum alloys and intimate contact assured by pressing it down firmly. The translucent-transparent nature of the backing permitted observation of any air bubbles, which could thus be readily eliminated. The alloys masked with this tape were then subjected to etching by immersion in 10% sodium hydroxide solution maintained at 190° F. for periods of up to eight hours, aluminum being dissolved at the approximate rate of .001 inch per minute throughout this period. Despite the extreme turbulence of the etching solution caused by the myriad hydrogen bubbles, there was no lifting of the edges of the tape; in fact, the adhesion to metal was found to be so firm at 190° F. that the tape could not be removed without causing internal rupture of the adhesive layer. The etch-defined line of demarcation between the areas to be etched and the areas not to be etched remained sharp, and there was no irregular undercutting or distortion of the edges. The adhesive was not deteriorated by the action of either the caustic etchant or the highly reactive nascent hydrogen. After etching, the tape was readily removed to permit visual inspection of the milled edge, after which it was replaced as a protective cover.

This tape was found to function in the same effective manner when applied to such diverse metals as the following: steel, etched by nitric acid; titanium, etched by a 1:3 nitric acid:hydrofluoric acid blend; and magnesium-thorium alloys, etched by phosphoric acid or acid phosphate solutions.

---

[1] Without being limited to any theory, I believe that the magnesium oxide in this batch functions in a manner typical of polybasic metal oxides and polybasic metal salts of weak organic acids, which are thought to crosslink chlorosulfonated polymers in the presence of organic acids (e.g., wood rosin, hydrogenated wood rosin, or stearic acid) at curing temperatures as follows: The organic acid reacts with the metal oxide, liberating water which hydrolyzes the $SO_2$ groups in the chlorosulfonated polymer; the resultant sulfonic acid groups combine with more metal oxide to form crosslinks between the polymer chains.

The butadiene:styrene copolymer disclosed in the above example is a type which is well suited to processing on conventional rubber machinery; 1:1 blends are more difficult to process and inclined to be tough, but they can be used successfully, especially for applications where the temperature is likely to exceed 190° F.

Latitude may be exercised in selecting the various ratios of components employed in preparing my novel adhesive. For example, although the ratio butadiene:styrene copolymer to chlorosulfonated polymer is preferably about 1:1, it may be varied from about 5:1 to 5:6. Ratios higher than 5:1 tend to be less resistant to etching solutions, while ratios lower than 5:6 tend to be yield adhesives which lack the desired amount of tack. Similarly, where phenol-aldehyde is used as the crosslinking agent for the butadiene:styrene copolymer, it is preferably present in the amount of about 9% by weight of the total rubbery polymeric material; if appreciably less than 6% is employed, the adhesive system is too soft, and if more than about 12% is employed, it becomes too hard for most uses. Such other crosslinkers as elemental sulfur or sulfur-vulcanizing agents may also be employed with suitable modification of the process, although with some loss of tack. Further, the amount of tackifier resin may be varied from about 30 to 60 parts, based on 100 parts of rubbery polymer, with about 40 parts being preferred. Substantially lower amounts of resin do not tackify the adhesive to an acceptable level and likewise, substantially higher amounts result in the adhesive lacking acceptable tack properties.

As previously noted, it is extremely important that the surface of the tacky pressure-sensitive adhesive to be applied to the metal should be as smooth as possible to insure intimate contact therewith. For this reason, it is generally desirable to employ extruded films or metallic foils as backing sheets. Woven or felted backings require special care to insure smoothness of the adhesive surface, and where the back of the tape is somewhat rough or irregular it is necessary to employ a smooth liner to prevent the creation of air-entrapping pockets when the tape is wound in roll form. In addition, the backing should preferably be non-absorptive of the etching solution in order to prevent undesirable etching when, subsequent to removal of the masked workpiece from the treating bath, it is stored in intimate contact with an unprotected surface of another workpiece.

Having described various illustrative features of my invention, what I claim is:

1. A pressure-sensitive adhesive tape which is suitable for masking in chemical milling operations, which can be readily removed after the milling operation is completed, and which may thereafter be reapplied as a protective cover, said tape comprising in combination: an acid- and base-resistant sheet backing material having adhered to one surface thereof a normally tacky pressure-sensitive acid- and base-resistant adhesive, said adhesive comprising a crosslinked rubber butadiene:styrene copolymer, a tackifier for said copolymer, and a crosslinked chlorosulfonated rubbery vinyl polymer compatible with both said copolymer and said tackifier, the ratio of butadiene:styrene copolymer to chlorosulfonated rubbery vinyl polymer being in the range of from about 5:1 to about 5:6.

2. The article of claim 1 in which the chlorosulfonated rubbery polymer is chlorosulfonated polyethylene.

3. The article of claim 1 in which the backing is a smooth, thin, flexible acid- and base-resistant, non-absorptive self-supporting continuous polymeric film.

4. A pressure-sensitive adhesive tape which is suitable for masking in chemical milling operations carried out at temperatures as high as 190° F., which can be readily removed after the milling operation is completed and thereafter re-applied as a protective cover, said tape comprising in combination: a smooth, hydrophobic, non-absorbent acid- and base-resistant sheet backing material having adhered to one surface thereof a normally tacky and pressure-sensitive adhesive, said adhesive comprising a rubbery butadiene:styrene copolymer crosslinked with an oil-soluble heat-reactive phenolic resin, a tackifier for said copolymer, and a crosslinked acid- and base-resistant chlorosulfonated polyethylene polymer, said polymer being compatible with both said copolymer and said tackifier, the exposed surface of said pressure-sensitive adhesive being substantially free from irregularities, thereby permitting said tape to be applied to a metal surface in such a manner that said adhesive establishes uniform intimate contact with said metal.

5. A pressure-sensitive adhesive tape which is suitable for masking in chemical milling operations, which can be readily removed after the milling operation is completed, and which may thereafter be reapplied as a protective cover, said tape comprising in combination: a biaxially oriented polyethylene terephthalate film having adhered to one surface thereof a normally tacky and pressure-sensitive adhesive, said adhesive comprising a blend of approximately equal parts of a rubbery butadiene:styrene copolymer and a rubbery chlorosulfonated polyethylene polymer, from about 6 to about 12 percent of an oil-soluble heat-reactive phenolic resin based on total rubbery polymer, from about 30 to about 60 percent of a tackifier based on total rubbery polymer, said tackifier being compatible with both said copolymer and said chlorosulfonated polyethylene polymer, a polybasic metal oxide, and an organic acid.

References Cited in the file of this patent

UNITED STATES PATENTS

| | | |
|---|---|---|
| 2,559,990 | Oace et al. | July 10, 1951 |
| 2,708,192 | Joesting et al. | May 10, 1955 |
| 2,878,142 | Bohaty | Mar. 17, 1959 |
| 2,968,637 | Bowers | Jan. 17, 1961 |

FOREIGN PATENTS

| | | |
|---|---|---|
| 790,159 | Great Britain | Feb. 5, 1958 |